United States Patent [19] [11] 3,969,298
Gasman [45] July 13, 1976

[54] SELECTED LIPOPHILIC AMINIMIDES AND POLYMERS DERIVED THEREFROM USEFUL FOR MAKING STABLE EMULSIONS

[75] Inventor: Robert C. Gasman, Schaumberg, Ill.

[73] Assignee: The Kendall Company, Boston, Mass.

[22] Filed: Nov. 8, 1974

[21] Appl. No.: 522,071

Related U.S. Application Data

[60] Continuation of Ser. No. 381,932, Aug. 24, 1973, which is a division of Ser. No. 120,331, March 2, 1971.

[52] U.S. Cl. .................. 260/29.6 HN; 260/29.6 H; 260/78 UA; 260/78.3 UA; 526/218; 526/320; 526/327; 526/328; 526/411; 526/344
[51] Int. Cl.² .......................................... C08F 3/90
[58] Field of Search ................. 260/80.3 N, 89.7 R, 260/29.6 HN, 78 UA, 29.6 H, 78.3 UA

[56] References Cited
UNITED STATES PATENTS

| | | | |
|---|---|---|---|
| 2,478,378 | 8/1949 | Dickey | 260/78.3 UA |
| 3,485,806 | 12/1969 | Bloomquist et al. | 260/80.3 N |
| 3,780,092 | 12/1973 | Samour et al. | 260/29.6 HN |
| 3,795,648 | 3/1974 | Samour et al. | 260/29.6 HN |

Primary Examiner—Joseph L. Schofer
Assistant Examiner—Peter F. Kulkosky
Attorney, Agent, or Firm—Ellen P. Trevors

[57] ABSTRACT

Lipophilic aminimides containing ethylenically-unsaturated moieties and carboxylic acid groups are disclosed. These compounds are useful as monomeric emulsion stabilizers, and may be polymerized with various co-monomers to provide pressure-sensitive adhesives.

6 Claims, No Drawings

SELECTED LIPOPHILIC AMINIMIDES AND POLYMERS DERIVED THEREFROM USEFUL FOR MAKING STABLE EMULSIONS

This is a continuation, of application Ser. No. 381,932 filed Aug. 24, 1973, which is a divisional of application S.N. 120,331 filed on Mar. 2, 1971.

This invention relates to selected lipophilic aminimides, to the use of said lipophilic aminimides as monomeric emulsion stabilizers for the polymerization of ethylenically-unsaturated monomers, to pressure-sensitive adhesive polymers containing recurring units of said lipophilic aminimides and to flexible sheet material having a coating containing such pressure-sensitive adhesive polymers.

Various aminimides have been previously prepared and reported in the literature. Thus, U.S. Pat. No. 3,410,880 discloses aminimides containing aliphatic hydrocarbon radicals and their use in detergent compositions, while U.S. Pat. Nos. 3,485,806 and 3,527,802 describe the preparation of selected aminimides containing acryloyl or methacryloyl moieties.

Now it has been found that certain lipophilic aminimides containing ethylenically-unsaturated moieties and lipophilic groups can be provided according to this invention. More specifically these lipophilic aminimides have the formula

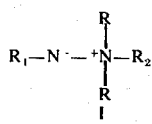

wherein each R is an independently selected alkyl moiety; and wherein a. $R_1$ is an ethylenically-unsaturated radical containing a carboxylic acid group and $R_2$ is a lipophilic radical comprising an aliphatic hydrocarbon chain having at least about 10 carbon atoms; or b. $R_1$ is a lipophilic radical comprising a carboxylic acid group and an aliphatic hydrocarbon chain and $R_2$ is an ethylenically-unsaturated radical.

It is a critical feature of the compounds of this invention that they contain a selected lipophilic radical, an ethylenically-unsaturated moiety, and a carboxylic acid group. Thus, it has been found that the presence of the carboxylic acid group is essential to the functioning of these compounds as monomeric emulsion stabilizers. The necessity of having a free carboxylic acid group is surprising in view of the disclosure of the aforementioned U.S. Pat. No. 3,485,806, which teaches that the aminimides disclosed therein should be free of such acid groups.

While any compound having the general formula I can be provided according to this invention, preferred aminimides include those compounds I wherein each R is an independently selected alkyl having 1 to 3 carbon atoms and $R_1$ and $R_2$ are selected from group a) wherein $R_1$ is 4-hydroxymaleoyl or 4-hydroxyfumaroyl (HOCO-CH=CH-CO-), 4-hydroxycitraconoyl (HOCO-CH=C(CH$_3$)-CO-) or 4-hydroxyitaconoyl

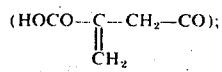

and $R_2$ is a lipophilic radical comprising an aliphatic hydrocarbon chain having about 10 to about 28 carbon atoms.

The term "aliphatic hydrocarbon chain" in the claims and specification herein includes saturated, unsaturated, straight-chain and branched groups.

By the term "lipophilic radical" in the case of $R_2$ is meant an aliphatic hydrocarbon chain covalently linked to the nitrogen either directly or through an intermediate linkage as illustrated below where L represents the aliphatic hydrocarbon chain: a benzyl group,

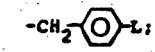

an ester or amide group such as -CH$_2$-CHR'-ACO-L wherein R' is hydrogen or methyl and A is oxygen or -NH-; a polyalkylene oxide or alkylene ether group such as -CH$_2$-CHR$_3$-(O-CH$_2$-CHR$_3$)$_n$-OL wherein R$_3$ is hydrogen or methyl and n is zero to 4; an acetoxy or acetamido group such as -CH$_2$-CO-OL and -CH$_2$-CO-NHL; a hydroxysuccinyloxy or hydroxysuccinylamino group having the formula -R$_4$-A-CO-CHL-CH$_2$-COOH wherein R$_4$ is a diradical, preferably ethylene, propylene, isopropylene, 2-hydroxypropylene, acetoxypropylene, or -CH$_2$-CHR$_5$-(O-CH$_2$-CHR$_5$)$_n$- where R$_5$ is hydrogen or methyl and n is zero to 4, and A is oxygen or -NH-; and isomers of the aforementioned hydroxysuccinyloxy or hydroxysuccinylamino groups wherein the aliphatic hydrocarbon chain L is attached to the carbon atom adjacent to the carboxyl group.

The aminimides having the formula I wherein $R_1$ and $R_2$ are selected from group (a) can be readily provided by reacting a stoichiometric amount of an appropriate substituted hydrazine with a lipophilic halide followed by reaction with a suitable acid anhydride. Illustrative hydrazines include unsymmetrical dimethyl hydrazine, unsymmetrical diethyl hydrazine, unsymmetrical dipropyl hydrazine, methyl ethyl hydrazine, etc.

Exemplificative lipophilic halides suitable for use in the preparation of aminimides I includes decyl chloride, p-dodecyl benzyl chloride, octadecyl chloride, octacosyl chloride, tridecyl chloroacetate, dodecyl chloride, tetradecyl chloride, hexadecyl chloride, undecyl bromide, tridecyl bromide, pentadecyl bromide, heptadecyl bromide, oleyl bromide and the chloroacetamide derivative of Primene 81R. The latter material, marketed by the Rohm and Haas Company, is reported to be a mixture of t-alkyl primary amines consisting principally of $C_{11}$ to $C_{14}$ alkyl amines having highly branched alkyl groups in which the primary amino nitrogen is directly attached to a tertiary carbon atom. Preferably, mixtures of lipophilic halides having an average number of carbon atoms between 10 and 28 are employed.

The acid anhydrides appropriate for use in the preparation of compounds I are maleic anhydride, citraconic anhydride and itaconic anhydride. Isomerization of the 4-hydroxymaleoyl compounds I according to well-known techniques will provide the 4-hydroxyfumaroyl compounds. The aforementioned reaction to provide the aminimides I can be carried out over a wide temperature range. The first part of the reaction, i.e. the quaternization of the hydrazine, is carried out at a temperature of about 60°C to 120°C, preferably 75°–85°C, while reaction of the quaternized hydrazine with the anhydride can be effected at temperatures of about 30° to 80°C, preferably 40°–50°C.

While the reaction proceeds satisfactorily in the absence of solvents or diluents, an appropriate solvent can be advantageously employed to insure continuance of the reaction in the liquid phase. In the first stage of the reaction, diluents such as acetonitrile, propionitrile, butyronitrile can be utilized, while alcohols such as isopropanol and t-butanol can be employed in the second part of the reaction.

An appropriate acid acceptor is used to generate the aminimide from the hydrazonium salt. Such acid acceptors include methanolic sodium methoxide, aqueous solutions of alkali or alkaline earth hydroxides, anionic ion exchange resins, etc.

Other preferred aminimides are those compounds I wherein each R is an independently selected alkyl having 1 to 3 carbon atoms and $R_1$ and $R_2$ are selected from group b) wherein the lipophilic radical $R_1$ comprises an aliphatic hydrocarbon chain covalently linked to the nitrogen through an hydroxysuccinyl linkage, and the ethylenically-unsaturated radical $R_2$ is a radical containing a carbon to carbon double bond capable of polymerization with other ethylenically unsaturated monomers, said bond being one which is a terminal carbon to carbon double bond, e.g. as in a vinyl radical, or one which is conjugated with the double bond of a carbon to oxygen linkage, e.g. as in the alpha, beta unsaturated dicarboxylic acids and acrylic and methacrylic acids, and preferably where $R_2$ is -A-V, as illustrated by the following general formula wherein L is an aliphatic hydrocarbon chain as previously described:

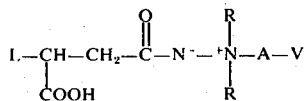

In the above formula, A is ethylene, propylene, isopropylene, 2-hydroxypropylene, acetoxypropylene or -O-CH$_2$-CHR$_6$(O-CH$_2$-CHR$_6$)$_n$- where $R_6$ is hydrogen or methyl and n is zero to 4 and V is acryloyloxy, methacryloyloxy, acrylamido, methacrylamido, vinyloxy, allyloxy, methallyloxy, vinylacetoxy, allylacetoxy, methallylacetoxy, allyl, methallyl, 4-hydroxymaleoyloxy, 4-hydroxyfumaroyloxy, 4-hydroxycitraconoyloxy, or 4-hydroxyitaconoyloxy; with the proviso that A is zero where V is vinylacetoxy, allylacetoxy, methallylacetoxy, allyl or methallyl. Isomers of the above compounds wherein the aliphatic hydrocarbon chain L is attached to the carbon atom adjacent to the carbonyl group in the hydroxysuccinyl linkage are also included in the scope of this invention.

Compounds having the above formula are readily provided by reacting a vinyl monomer containing an active halogen or an oxirane group, i.e. a compound of the formula V-A-X wherein V and A are as previously described and X is halogen or oxirane, with one of the aforementioned substituted hydrazines followed by reaction with a succinic anhydride having the following formula wherein L is as previously described:

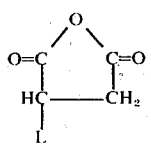

Representative vinyl monomers having the formula V-A-X include 2-bromoethyl acrylate, glycidyl acrylate, 4-hydroxymaleoyloxyethylene chloride, 2-chloroethylacrylamide, allyl chloroacetate, methallyl chloroacetate, acryloyloxypropenyl chloride, 3-methyacryloyloxy, 2-hydroxypropylene chloride, acryloyloxydi (ethylenoxy) ethylene chloride, allyl bromide, methallyl chloride, etc. The reaction conditions, i.e. temperature, diluents, etc. are similar to those described for the preparation of compounds I wherein $R_1$ and $R_2$ are selected from group a).

Particularly preferred aminimides are those compounds having the formula I wherein each R is methyl or ethyl and the lipophilic radical comprises an aliphatic hydrocarbon chain having from about 10 to about 18 carbon atoms.

As indicated previously, the aminimides of this invention function as monomeric emulsion stabilizers, which are organic monomers which stabilize an emulsion of monomers and copolymerize with an ethylenically-unsaturated monomer, becoming a part of the final polymer, while stabilizing the polymerization process against the formation of coagulum and against subsequent phase separation. Thus, although emulsion polymerization processes can be carried out without the use of a monomeric emulsion stabilizer by using conventional surface-active agents, this is undesirable in that it leads to the presence of a water-sensitive ingredient in the final polymeric latex.

Illustrative ethylenically-unsaturated monomers suitable for copolymerizing with the monomeric emulsion stabilizers of this invention comprise vinyl acetate, vinyl chloride, acrylonitrile, and acrylic monomers in general represented by the formula

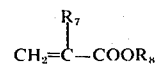

where $R_7$ is a hydrogen atom or a methyl group, and $R_8$ is an alkyl radical of 1 to 18, and preferably 1 to 10 carbon atoms. As is known in the art of preparing acrylic ester polymers, the softness of the polymer and the difficulty of initiating polymerization may increase as the number of carbon atoms in the ester group increases. In the practice of this invention, when the acrylic monomer contains more than 8 carbon atoms in the ester group, it is advantageous for ease of initiation and polymerization to mix therewith at least about 20 mole per cent of an acrylic ester with fewer than 4 carbon atoms in the ester group.

Mixtures of more than one such ethylenically-unsaturated monomer may be used, and in order to impart special properties of toughness, rigidity, or cross-linking reactivity to the polymer, a minor proportion, usually less than 20 mole percent, of the major monomer may be replaced by some other ethylenically-unsaturated monomer such as vinyl esters other than vinyl acetate as typified by vinyl laurate and vinyl stearate; vinyl ethers such as vinyl methyl ether, vinyl ethyl ether, and vinyl butyl ether; di-unsaturated monomers such as diethylene glycol diacrylate, ethylene glycol diitaconate, diallyl phthalate, divinyl benzene and the like; acrylamide and methacrylamide, hydroxyethyl acrylate and methacrylate, hydroxypropyl acrylate and methacrylate, and styrene.

The polymerization process is carried out by emulsion polymerization techniques, employing a redox or non-redox catalyst system. Illustrative redox catalyst systems are hydrogen peroxide/ascorbic acid and ferrous ammonium sulfate, tert-butyl hydrogen peroxide/ascorbic acid and ferrous ammonium sulfate, potassium persulfate/sodium bisulfite, potassium persulfate/sodium metabisulfite, etc. Non-redox catalysts include hydrogen peroxide, potassium persulfate, etc. Polymerization can be carried out by a batch loaded technique wherein an emulsion of monomers and monomeric emulsion stabilizer, prepared by agitating the monomers and stabilizer in an aqueous medium, is sparged with nitrogen and then the catalyst system is added to the emulsion. The delayed addition technique of polymerization can also be used; in an example of this process using a redox catalyst system, an emulsion of monomers and monomeric emulsion stabilizer containing the peroxide or persulfate is prepared. A portion of this emulsion is added to the reactor along with the ascorbic acid and ferrous ammonium sulfate, or potassium persulfate respectively. The remainder of the emulsion is added slowly, usually over a period of 1 hour. The polymerization reactions are initiated at various temperatures, depending on the catalyst system. Thus, redox systems are preferably initiated at temperatures of about 0°C to ambient and non-redox systems at about 50°–60°C.

In general, in the polymerization process of this invention, 1.0 to 30 percent by weight of monomeric emulsion stabilizer is employed, with 3 to 10 percent by weight being preferred. The amount of monomeric emulsion stabilizer is based on the total monomers added to the polymerization reaction; mixtures of monomeric emulsion stabilizers having the formula I can be employed.

Aqueous polymeric dispersions may be prepared according to this invention in which the solid polymer content is 40% to 50% by weight. If desired, the solids content may be diluted to 1% by weight or less, with excellent retention of stability at both the higher and lower concentrations. The polymer can be separated from the polymerization medium by coagulation, e.g. with isopropanol.

Although the aminimides I of this invention can be used in the preparation of binders, they are particularly suitable for the preparation of pressure-sensitive adhesive polymers. In this embodiment, they are generally copolymerized with an acrylic ester to provide an excellent thermosetting pressure-sensitive adhesive. They are readily applied to appropriate flexible backings by conventional techniques such as casting, calendering etc. Suitable flexible backings include polyester films, e.g. polyethylene terephthalate and tensilized polyethylene terephthalate; vinyl films; polyethylene films; polyethylene-polypropylene films; aluminum foil; cloth; laminates of vinyl film and cloth; glass cloth; non-woven materials; paper; strand-reinforced paper; etc. If desired, an adhesive priming coat may be applied to the flexible backing prior to coating with the pressure-sensitive adhesive composition, but this is not essential to the preparation of excellent adhesive tapes.

In the following examples, a POLYKEN Probe Tack Tester was used in determining the probe tack. This apparatus, which is fully described in U.S. Pat. No. 3,214,971, consists of four functional parts: (1) a cylindrical steel probe attached to the compression loaded spring of (2) a Series L Hunter Mechanical Force Gage (Hunter Spring Company, Brochure 750/FG, revised February 1961), (3) an annulus having an opening slightly larger than the diameter of the probe and (4) a carrier for the annulus which moves down to bring the annulus around the probe and then up to remove the annulus therefrom. The carrier moves at a speed of 0.1 inch per second. At the beginning of the test, the carrier is at its uppermost point of travel, the annulus rests upon the carrier. The annulus is positioned on the carrier so that the opening in the annulus is in line with the probe positioned beneath it. A strip of tape is placed upon the annulus, adhesive surface down, and spanning the annulus opening. As the carrier is driven downwardly by a synchronous motor, the adhesive surface exposed through the opening is brought into contact with the flat surface of the probe. The tape, and the annulus attached thereto, is suspended on the probe as the carrier continues further on its downward path. The carrier then reverses its movement, returning to pick up the annulus, thereby separating the tape from the probe surface. Separation begins after one second contact between the probe and adhesive. The force required to separate the tape from the probe is recorded on the force gauge. The recorded value is the probe tack value. Measurements were made employing probes having weights of 10, 100 and 500 gms.

The peel adhesion values are the forces required to remove an adhesive tape from a stainless steel surface after contact therewith for 2 minutes at a temperature of about 75°F. The tape was stripped from the surface at a 180° angle at a rate of 12 inches per minute.

The creep resistance test is designed to test the resistance of the adhesive coating to shearing within the plane of the adhesive coating. A one inch strip of tape is applied to the vertical stainless steel surface heated to a temperature of about 90°F. A 1 kg. weight is hung from the metal surface. The failure time is that time at which the tape falls from the stainless steel surface under the stress applied by the 1 kg. weight.

Rolling ball tack was determined by securing a piece of the adhesive tape, adhesive side up, to a horizontal surface. A steel ball ½ inch in diameter is placed on a track, inclined 60° to the horizontal test surface; the vertical height in inches from which the ball is released is the first reported value. The ball is released, and allowed to roll to a stop on the adhesive. The distance in inches traveled on the adhesive is reported as the second measurement.

EXAMPLE 1

A. Preparation of Monomer

A solution of unsymmetrical dimethyl hydrazine (30 g., 0.5 mole) in acetonitrile (125 g.) was prepared in a 4-necked, round bottom flask fitted with a stirrer, condenser, thermometer and two addition funnels. The solution was heated to 80°C and 89 g. of a mixture of alkyl chlorides containing approximately 97% decyl chloride, was added while maintaining the reaction mixture at 81°C. After the completion of the addition, the reaction mixture was maintained at 80°C for an additional 3 hours. Then the mixture was allowed to cool to 45°C. A solution of maleic anhydride (49 g., 0.5 mole) in t-butanol (300 ml.) was added from one funnel and a solution of sodium methoxide (27 g., 0.5 mole) in dry methanol (250 ml.) was added from the other funnel. After completion of the addition, the reaction mixture was maintained at 45°C for 3 hours. Then the mixture was allowed to cool to room temperature, filtered to separate salt and concentrated to dryness on a thin-film evaporator. The infrared spectrum of the resulting thick syrup showed aminimide absorption at 1580 cm$^{-1}$, confirming that 1,1-dimethyl-1-decylamine-4-hydroxymaleoylimide had been obtained.

B. Preparation of Polymer

An emulsion was prepared by blending water (1660 ml.) with 320 g. of a 50% solution in deionized water of the 1,1-dimethyl-1-decylamine-4-hydroxymaleoylimide prepared in part A, 2-ethylhexyl acrylate (650 g.) and ethyl acrylate (200 g.) in a 4-necked, round bottom flask fitted with paddle stirrer, condenser, thermometer and nitrogen dispersion tube. The emulsion was cooled to 12.5°C and sparged with nitrogen for 15 minutes. Then hydrogen peroxide (20 ml. of three per cent aqueous solution) was added to the mixture, followed by ascorbic acid (0.3 g.) and ferrous ammonium sulfate (.021 g.) in 20 ml. of water; polymerization was initiated soon after the addition, as indicated by a rise, over 12 minutes, in temperature to 20°C, after which the polymerization was allowed to proceed for approximately one-half hour. The resulting polymer was coagulated with isopropanol to give a tough, grainy crumb. An adhesive tape was prepared by coating a polyethylene terephthalate film with a toluene solution of this polymer to a dry thickness of 1.7 mil. The properties of the resulting pressure-sensitive adhesive are set forth in the table.

EXAMPLE 2

A. Preparation of Monomer

Following the procedure of Example 1, 1,1-dimethyl-1-p-dodecylbenzylamine-4-hydroxymaleoylimide was prepared from unsymmetrical dimethyl hydrazine (120 g., 2 moles) in acetonitrile (500 g.), a mixture of alkyl chlorides (590 g., 2 moles), comprising about 95% p-dodecyl benzyl chloride, a solution of maleic anhydride (190 g., 2 moles) in t-butanol (700 ml.) and a solution of sodium methoxide (108 g., 2 moles) in dry methanol (1000 ml.). The infrared spectrum of the product showed aminimide absorption at 1580 cm$^{-1}$.

B. Preparation of Polymer

The amount of 300 g. of a 50% aqueous solution of the 1,1-dimethyl-1-p-dodecylbenzylamine-4-hydroxymaleoylimide prepared in part A was copolymerized with 2-ethylhexyl acrylate and ethyl acrylate following the procedure and employing the quantities set forth in part B in Example 1. The polymer was coated on polyethylene terephthalate film to a dry mass thickness of 1.4 mil; the properties of the pressure-sensitive adhesive are listed in the table.

C. Preparation of Polymer

A polymer was prepared utilizing the procedure and reactant amounts of part B, but substituting butyl acrylate for 2-ethylhexyl acrylate; the properties of the resulting pressure-sensitive adhesive are given in the table.

EXAMPLE 3

A. Preparation of Monomer

Following the procedure of the preceding examples, 1,1-dimethyl-1-dodecylamine-4-hydroxymaleoylimide was prepared by reacting unsymmetrical dimethyl hydrazine (30 g., 0.5 mole) in acetonitrile (125 g.), a mixture of alkyl chlorides (103 g., 0.5 mole) containing about 97% dodecyl chloride, maleic anhydride (49 g., 0.5 mole) in t-butanol (300 ml.) and sodium methoxide (27 g., 0.5 mole) in dry methanol (250 ml.). Confirmation that the product had been obtained was indicated by the presence of the aminimide absorption peak at 1580 cm$^{-1}$ in the infrared spectrum.

B. Preparation of Polymer

A polymer similar to that described in part B of Example 2 was prepared employing 1,1-dimethyl-1-dodecylamine-4-hydroxymaleoylimide instead of 1,1-dimethyl-1-p-dodecylbenzylamine-4-hydroxymaleoylimide. The polymerization procedure and reactant amounts described in Example 2 were employed in the preparation of this polymer. The properties of the resulting pressure-sensitive adhesive, which had a mass thickness of 2.2 mils when coated on polyethylene terephthalate film, are listed in the table.

EXAMPLE 4

A. Preparation of Monomer

Following the procedure of the preceding examples, 1,1-dimethyl-1-tetradecylamine-4-hydroxymaleoylimide was prepared by reacting unsymmetrical dimethyl hydrazine (30 g., 0.5 mole) in acetonitrile (125 g.) with a mixture of alkyl chlorides (118 g., 0.5 mole) containing about 97% tetradecyl chloride, maleic anhydride (49 g., 0.5 mole) in t-butanol (300 ml.) and sodium methoxide (27 g., 0.5 mole) in dry methanol (250 ml.). Aminimide absorption at 1580 cm$^{-1}$ was observed in the infrared spectrum of the product.

B. Preparation of Polymer

A polymer was prepared utilizing the procedure and reactant amounts described in part B of Example 2, but employing 1,1-dimethyl-1-tetradecylamine-4-hydroxymaleoylimide (498 g.) instead of 1,1-dimethyl-1-p-dodecylbenzylamine-4-hydroxymaleoylimide. The properties of the resulting pressure-sensitive adhesive, when coated on polyethylene terephthalate film to a thickness of 1.5 mils, are listed in the table.

EXAMPLE 5

A. Preparation of Monomer

Following the procedure of the preceding examples, 1,1-dimethyl-1-hexadecylamine-4-hydroxymaleoylimide was prepared by reacting unsymmetrical dimethyl hydrazine (30 g., 0.5 mole) in acetonitrile (125 g.) with a mixture of alkyl chlorides (132 g., 0.5 mole) containing about 97% hexadecyl chloride, maleic anhydride (49 g., 0.5 mole) in t-butanol (300 ml.) and sodium methoxide (27 g., 0.5 mole) in dry methanol (250 ml.). The infrared spectrum of the product showed aminimide absorption at 1580 cm$^{-1}$.

B. Preparation of Polymer

A polymer was prepared utilizing the procedure and reactant amounts described in part B of Example 2, but employing 1,1-dimethyl-1-hexadecylamine-4-hydroxymaleoylimide instead of the aminimide of that example. The properties of the resulting pressure-sensitive adhesive, which was coated on polyethylene terephthalate film to a thickness of 2 mils, are listed in the table.

EXAMPLE 6

A. Preparation of Monomer

Following the procedure of the preceding examples, 1,1-dimethyl-1-octadecylamine-4-hydroxymaleoylimide was prepared by reacting unsymmetrical dimethyl hydrazine (30 g., 0.5 mole) in acetonitrile (125 g.) with a mixture of alkyl chlorides (144 g., 0.5 mole) containing 97% octadecyl chloride, maleic anhydride (49 g., 0.5 mole) in t-butanol (300 ml.) and sodium methoxide (27 g., 0.5 mole) in dry methanol (250 ml.). The infrared spectrum of the product showed aminimide absorption at 1580 cm$^{-1}$.

B. Preparation of Polymer

A polymer was prepared utilizing the procedure and reactant amounts described in part B of Example 2, but employing 1,1-dimethyl-1-octadecylamine-4-hydroxymaleoylimide as the aminimide. The properties of the resulting pressure-sensitive adhesive, which was coated on polyethylene terephthalate film to a dry thickness of 1.3 mils, are listed in the table.

EXAMPLE 7

A. Preparation of Monomer

Following the procedure of the preceding examples, 1,1-dimethyl-1-p-dodecylbenzylamine-4-hydroxycitraconoylimide was prepared by reacting unsymmetrical dimethyl hydrazine (30 g., 0.5 mole) in acetonitrile (125 g.) with an alkyl chloride mixture 147 g., 0.5 mole) containing about 95% p-dodecylbenzyl chloride followed by reaction with citraconic anhydride (56 g., 0.5 mole) in t-butanol (185 ml.) in the presence of sodium methoxide (27 g., 0.5 mole) in dry methanol (250 ml.). Confirmation that the product had been obtained was indicated by the presence of the aminimide absorption peak at 1580 cm$^{-1}$ in the infrared spectrum.

B. Preparation of Polymer

Following the procedure of the preceding examples, a pressure-sensitive polymer was prepared by copolymerizing the aminimide described in part A (50 g. of a 30% aqueous solution) with 2-ethylhexyl acrylate (65 g) and ethyl acrylate (20 g.) in the presence of water (140 ml.), hydrogen peroxide (2 ml. of 3% aqueous solution) and 3 ml. of aqueous reductant solution containing ascorbic acid (.03 g.) and ferrous ammonium sulfate (.0021 g.). The polymer was coated on polyethylene terephthalate film to a dry thickness of 1.8 mils; the properties of the pressure-sensitive adhesive are given in the table.

EXAMPLE 8

A. Preparation of Monomer

Following the procedure of the preceding examples, 1,1-dimethyl-1-p-dodecylbenzylamine-4-hydroxyitaconoylimide was prepared by reacting unsymmetrical dimethyl hydrazine 13.3 g.) in acetonitrile (110 g.) with an alkyl chloride mixture (65.5 g.) containing 95% p-dodecyl benzyl chloride (65.5 g.) followed by reaction with itaconic anhydride (25 g.) in t-butanol (220 ml.) in the presence of sodium methoxide (12.0 g.) in dry methanol (110 ml.). The infrared spectrum of the product showed aminimide absorption at 1580 cm$^{-1}$.

B. Preparation of Polymer

A pressure-sensitive adhesive polymer was prepared following the procedure and employing the amounts set forth in part B of Example 7, but substituting 1,1-dimethyl-1-p-dodecylbenzylamine-4-hydroxyitaconoylimide for the aminimide of Example 7. The properties of the resulting pressure-sensitive adhesive, which was coated on polyethylene terephthalate film to a dry thickness of 1.7 ml., are given in the table.

EXAMPLE 9

A. Preparation of Monomer

A solution of unsymmetrical dimethyl hydrazine (25.3 g., 0.42 mole) in acetonitrile (200 ml.) was heated to 80°C and 2-chloroethyl acrylate (50.0 g., 0.42 mole) was added gradually thereto. The reaction mixture was maintained at 80°C for five hours and then cooled to 45°C. Following the procedure of the previous examples, a solution of octadecyl succinic anhydride (150 g., 0.42 mole) in t-butanol (300 ml.) and a solution of sodium methoxide (23 g., 0.42 mole) in methanol (300 ml.) was added and the resulting mixture maintained at 45°C for three to four hours. After filtration to remove salt, the filtrate was concentrated to a thin liquid which crystallized to provide 24 g. of 1,1-dimethyl-1-acryloyloxyethylamine-octadecyl-4-hydroxysuccinylimide, m.p. 50°C. The infrared spectrum of the product showed aminimide absorption at 1580 cm$^{-1}$. Analysis. - Calc'd for $C_{348}H_{54}N_{28}O_{80}$: C, 68.1; H, 10.7; Found: C, 65.78; H, 10.63;

B. Preparation of Copolymer

The amount of 5 g. of 1,1-dimethyl-1-acryloyloxyethylamine-octadecyl-4-hydroxysuccinylimide was dissolved in 73 ml. of water at 60°–70°C with stirring, and the solution cooled to 10°C. Then 2-ethylhexyl acrylate (30 g.) and ethyl acrylate (15 g.) were added and the emulsion sparged with nitrogen for about 30 minutes. Polymerization occurred upon the addition of 10 ml. of three percent aqueous hydrogen peroxide, ascorbic acid (1 g.) and ferrous ammonium sulfate (.07 g.) in 20 ml. water. The polymer was coagulated with isopropanol, washed, dissolved in toluene and coated on polyethylene terephthalate film. The dried coating was pressure-sensitive.

EXAMPLE 10

A. Preparation of Monomer

A mixture of glycidyl acrylate (32 g., 0.25 mole) and octadecyl succinic anhydride (87.2 g., 0.25 mole) in t-butanol (400 ml.) ws heated, with stirring, at 70°–80°C to dissolve the anhydride. Then unsymmetrical dimethyl hydrazine (15 g., 0.25 mole) was added and the reaction mixture was allowed to cool to room temperature, where it was maintained with stirring for seventy-two hours. The resulting liquid was concentrated to dryness and crystallized from isopropanol to provide a waxy, yellow solid, 1,1-dimethyl-1-acryloyloxy-2-hydroxypropylamine-octadecyl-4-hydroxysuccinylimide, m.p. 50°–51°C. The infrared spectrum of the product showed aminimide absorption at 1580 cm$^{-1}$.

B. Preparation of Copolymer

Following the procedure and employing the quantities of Example 9, part B, a copolymer similar to that of Example 9 was prepared employing 1,1-dimethyl-1-acryloyloxy-2-hydroxypropylamine-octadecyl-4-hydroxysuccinylimide as the aminimide.

COMPARATIVE EXAMPLE 1

For purposes of comparison, following the procedure described in Example 1, 1,1-dimethyl-1-octylamine-4-hydroxymaleoylimide was prepared from unsymmetrical dimethyl hydrazine (60 g., 1.0 mole) in acetonitrile (250 g.), a mixture of alkyl chlorides (149 g., 1.0 mole) containing about 97% octyl chloride and a solution of maleic anhydride (98 g., 1.0 mole) in t-butanol (350 ml.) in the presence of a solution of sodium methoxide (54 g., 1.0 mole) in dry methanol (500 ml.). Attempts to prepare a copolymer with 2-ethylhexyl acrylate and ethyl acrylate following the procedure and employing the reactant amounts described in Example 2, part B were unsuccessful; no initiation occurred.

COMPARATIVE EXAMPLE 2

For purposes of comparison, following the procedure described in Example 1, 1,1-dimethyl-1-p-dodecylbenzylamine-acrylimide was prepared from unsymmetrical dimethyl hydrazine (60 g., 1.0 mole) in acetonitrile (250 g.), p-dodecyl benzyl chloride (295 g., 1.0 mole) and a solution of methyl acrylate (86 g., 1.0 mole) in t-butanol (350 ml.) in the presence of a solution of sodium methoxide (54 g., 1.0 mole) in dry methanol (500 ml.). Attempts to prepare a copolymer with 2-ethylhexyl acrylate and ethyl acrylate following the procedure and employing the reactant amounts described in Example 2, part B were unsuccessful; no initiation occurred.

COMPARATIVE EXAMPLE 3

For purposes of comparison, following the procedure described in Example 1, 1,1-dimethyl-1-p-dodecylbenzylamine-methacrylimide was prepared from unsymmetrical dimethyl hydrazine (60 g., 1.0 mole) in acetonitrile (250 g.), p-dodecyl benzyl chloride (295 g., 1.0 mole) and a solution of methyl methacrylate (100 g., 1.0 mole) in t-butanol (350 ml.) in the presence of a solution of sodium methoxide (54 g., 1.0 mole) in dry methanol (500 ml.). Attempts to prepare a copolymer with 2-ethylhexyl acrylate and ethyl acrylate following the procedure and employing the reactant amounts described in Example 2, part B were unsuccessful; no initiation occurred.

is a lipophilic radical comprising an aliphatic hydrocarbon chain having about 10 to about 28 carbon atoms; or b. $R_1$ is a lipopholic radical comprising an aliphatic hydrocarbon chain covalently linked to the nitrogen through an hydroxysuccinyl linkage and $R_2$ is -A-V wherein A is ethylene, propylene, isopropylene, 2-hydroxypropylene, acetoxypropylene or $-O-CH_2-CHR_6-(O-CH_2-CHR_6)_n-$ where $R_6$ is hydrogen or methyl and n is zero to 4, and V is acryloyloxy, methacryloyloxy, acrylamido, methacrylamido, vinyloxy, allyloxy, methallyloxy, vinylacetoxy, allylacetoxy, methallyloacetoxy, allyl, methallyl, 4-hydroxymaleoyloxy, 4-hydroxyfumaroyloxy, 4-hydroxycitraconoyloxy, or 4-hydroxyitaconoyloxy; with the proviso that A is zero where V is vinylacetoxy, allylacetoxy, methallylacetoxy, allyl or methally, with at least one ethylenically-unsaturated monomer selected from the group consisting of vinyl chloride, vinyl acetate, acrylonitrile and acrylic esters having the formula

wherein $R_7$ is hydrogen or methyl and $R_8$ is $C_1$ to $C_{18}$ alkyl.

2. The process of claim 1 wherein between about 1.0

Table

| EXAMPLE | 1 | 2(B) | 2(C) | 3 | 4 | 5 | 6 | 7 | 8 |
|---|---|---|---|---|---|---|---|---|---|
| Probe Tack, (gms.) | | | | | | | | | |
| 10 gms. | 220 | 190 | 250 | 220 | 120 | 200 | 230 | 110 | 150 |
| 100 gms. | 380 | 440 | 370 | 370 | 230 | 230 | 360 | 480 | 370 |
| 500 gms. | 400 | 450 | 360 | 360 | 250 | 300 | 360 | 470 | 420 |
| Adhesion, oz./in. | 18.0 | 17.1 | 12.0 | 55.0 | 11.0 | 8.0 | 4.0 | 68.7 | 22.1 |
| Creep, hrs. | 5.0 | 1.0 | 100.0+ | <1.0 | <1.0 | <1.0 | >100 | .41 | 73.16 |
| Rolling Ball Tack, in. | 6/2.3 | 6/2.3 | 6/2.2 | 6/1.5 | 6/2.8 | 6/3.3 | — | — | — |

What is claimed is:

1. A process for stabilizing the polymerization of ethylenically-unsaturated monomers which comprises copolymerizing in an aqueous medium with a free-radical inorganic or organic percompound catalyst at least one compound having the formula

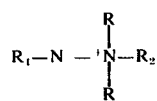

wherein each R is an independently selected alkyl having 1 to 3 carbon atoms and wherein a. $R_1$ is 4-hydroxymaleoyl, 4-hydroxyfumaroyl, 4-hydroxycitraconoyl or 4-hydroxyitaconoyl and $R_2$ and 30.0 weight percent of A is copolymerized with between about 99.0 and about 70.0 weight percent of B.

3. An organic polymer which comprises a minor portion of at least one compound A of claim 1 and a major portion of at least one compound B of claim 1.

4. The polymer of claim 3 wherein compound A comprises from about 3 to about 30 weight percent of the copolymer.

5. The polymer of claim 3 wherein compound A is 1,1-dimethyl-1-p-dodecylbenzylamine-4-hydroxymaleoylimide and compound B is a mixture of ethyl acrylate and 2-ethylhexyl acrylate.

6. A stable, surfactant-free aqueous dispersion of the copolymer of claim 3.

* * * * *